(12) United States Patent
Rijken et al.

(10) Patent No.: US 8,984,176 B2
(45) Date of Patent: Mar. 17, 2015

(54) SATA/ESATA PORT CONFIGURATION

(75) Inventors: Christopher Rijken, Houston, TX (US); Juan Martinez, Tomball, TX (US); Shan Chen, Taipei (TW); Peter W. Austin, Spring, TX (US); Chi W. So, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 663 days.

(21) Appl. No.: 13/125,972

(22) PCT Filed: Oct. 31, 2008

(86) PCT No.: PCT/US2008/082005
§ 371 (c)(1),
(2), (4) Date: Apr. 25, 2011

(87) PCT Pub. No.: WO2010/050969
PCT Pub. Date: May 6, 2010

(65) Prior Publication Data
US 2011/0208889 A1     Aug. 25, 2011

(51) Int. Cl.
G06F 13/14     (2006.01)
G06F 13/38     (2006.01)
G06F 3/06      (2006.01)
H01R 31/06     (2006.01)

(52) U.S. Cl.
CPC ............ G06F 13/385 (2013.01); G06F 3/0632 (2013.01); G06F 3/0634 (2013.01); *G06F 2213/0032* (2013.01); *G06F 2213/3802* (2013.01); *H01R 31/06* (2013.01)
USPC ................... 710/11; 710/10; 710/14; 710/62; 710/64; 710/72; 710/74; 710/104; 710/105; 710/305

(58) Field of Classification Search
CPC ... G06F 3/0632; G06F 3/0634; G06F 13/385; G06F 2213/0032; G06F 2213/3802
USPC ......... 710/62–64, 72–74, 300, 305, 306, 311, 710/313–315, 10, 11, 14, 104, 105
See application file for complete search history.

(56) References Cited

U.S. PATENT DOCUMENTS

| | | | |
|---|---|---|---|
| 6,781,826 B1 * | 8/2004 | Goldstone et al. | 361/679.33 |
| 6,843,660 B2 | 1/2005 | Barr et al. | |
| 6,983,338 B2 | 1/2006 | Hadba et al. | |
| 6,985,152 B2 * | 1/2006 | Rubinstein et al. | 345/520 |
| 7,065,603 B2 | 6/2006 | Smith et al. | |
| 7,186,147 B1 * | 3/2007 | Chou et al. | 439/660 |
| 7,216,195 B1 | 5/2007 | Brown et al. | |

(Continued)

OTHER PUBLICATIONS

WIPO, International Search Report, May 29, 2009, PCT/US2008/082005, filed Oct 31, 2008.

*Primary Examiner* — Ryan Stiglic
(74) *Attorney, Agent, or Firm* — Caven & Aghevli, LLC

(57) ABSTRACT

In one embodiment, a computer system comprises one or more processors, a circuit board assembly having at least one SATA port, a general purpose input/output port proximate the SATA port, signal generating logic to generate a signal when the general purpose input/output port is coupled to a connector, and a memory module communicatively connected to the one or more processors and comprising logic instructions stored in a computer readable medium which, when executed on the one or more processors, configure the one or more processors to configure the SATA port according to the signal generated by the signal generating circuitry.

19 Claims, 7 Drawing Sheets

(56) References Cited

U.S. PATENT DOCUMENTS

| | | | |
|---|---|---|---|
| 7,270,572 B2 | 9/2007 | Rubenstein et al. | |
| 7,308,534 B2 | 12/2007 | Mimatsu et al. | |
| 7,393,247 B1* | 7/2008 | Yu et al. | 439/638 |
| 7,440,287 B1* | 10/2008 | Ni et al. | 361/752 |
| 7,558,899 B2* | 7/2009 | Yip | 710/300 |
| 7,600,069 B2* | 10/2009 | Lin | 710/315 |
| 7,650,447 B2* | 1/2010 | Barras | 710/74 |
| 7,806,733 B2* | 10/2010 | Lee et al. | 439/660 |
| 7,925,802 B2* | 4/2011 | Lauterbach et al. | 710/38 |
| 8,122,172 B2* | 2/2012 | Lu et al. | 710/107 |
| 8,239,581 B2* | 8/2012 | Ibarra et al. | 710/2 |
| 8,250,266 B2* | 8/2012 | Rugg et al. | 710/72 |
| 8,301,831 B2* | 10/2012 | Ni et al. | 711/103 |
| 2004/0120353 A1* | 6/2004 | Kim et al. | 370/503 |
| 2006/0094286 A1* | 5/2006 | Lee et al. | 439/489 |
| 2006/0294272 A1* | 12/2006 | Chou et al. | 710/62 |
| 2007/0115954 A1* | 5/2007 | Wu et al. | 370/359 |
| 2007/0270026 A1* | 11/2007 | Lo | 439/499 |
| 2007/0294459 A1* | 12/2007 | Chen | 710/315 |
| 2008/0076301 A1* | 3/2008 | Liu | 439/630 |
| 2008/0162755 A1* | 7/2008 | Minami | 710/74 |
| 2008/0288703 A1* | 11/2008 | Iyer | 710/305 |
| 2009/0019301 A1* | 1/2009 | Minami | 713/324 |
| 2009/0094394 A1* | 4/2009 | Wu et al. | 710/72 |
| 2009/0286421 A1* | 11/2009 | Rugg et al. | 439/505 |
| 2011/0072186 A1* | 3/2011 | Cheng | 710/315 |
| 2012/0124253 A1* | 5/2012 | Cheng | 710/38 |
| 2012/0185631 A1* | 7/2012 | Lin et al. | 710/306 |
| 2012/0254598 A1* | 10/2012 | Mikuszewski et al. | 713/1 |

* cited by examiner

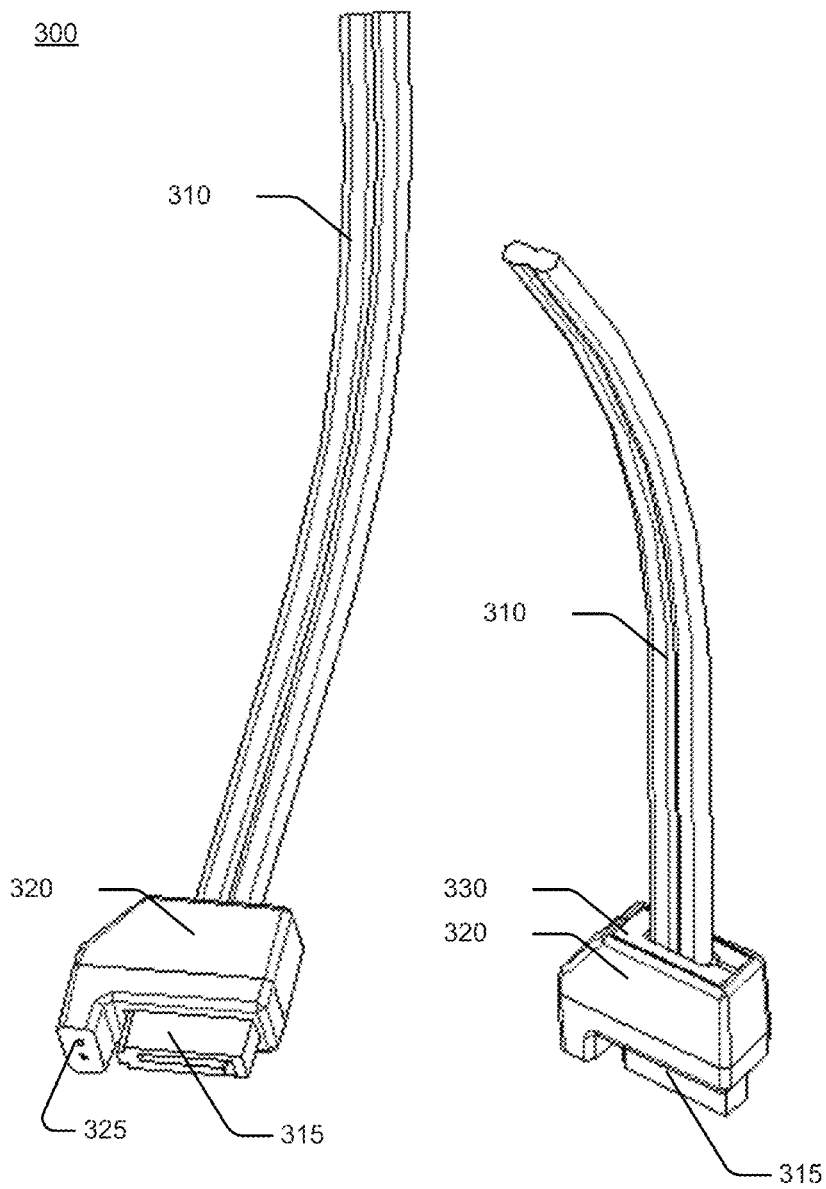

SATA/ESATA PORT CONFIGURATION

CROSS-REFERENCE TO RELATED APPLICATION

This application is a national stage application under 35 U.S.C. §371 of PCT/US2008/082005 filed Oct. 31, 2008.

BACKGROUND

Many electronic devices include multiple subassemblies such as chips, chipsets, printed circuit assemblies (PCAs) and the like connected by one or more cable assemblies. One example of a cable assembly is a Serial Advanced Technology Attachment (SATA) cable assembly, which is commonly used to connect a system board to an internal storage device, e.g., a hard disk drive assembly. Another example of a cable assembly is an External SATA (eSATA) cable assembly, which is commonly used to connect a system board to an external storage device, e.g., an external hard disk.

Most computer system boards comprise at least one SATA port. However, many current system boards do not include an eSATA port. Accordingly, techniques to enable eSATA adapters to couple to SATA ports may find utility.

BRIEF DESCRIPTION OF THE DRAWINGS

FIGS. 3A-3E are various perspective views of a cable assembly adapted to implement SATA/eSATA port configuration, according to embodiments.

DETAILED DESCRIPTION

Described herein are exemplary systems and methods for electrical encoding of cable types and configurations that may be used, e.g., in a computer system. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods. In alternate embodiments, the methods may be implanted as hard-wired logic circuits, or as logic in a configurable processing device such as, for example, a field programmable gate array (FPGA) or the like. In some implementations the methods may also be executed manually, in whole or in part.

Figure 1:
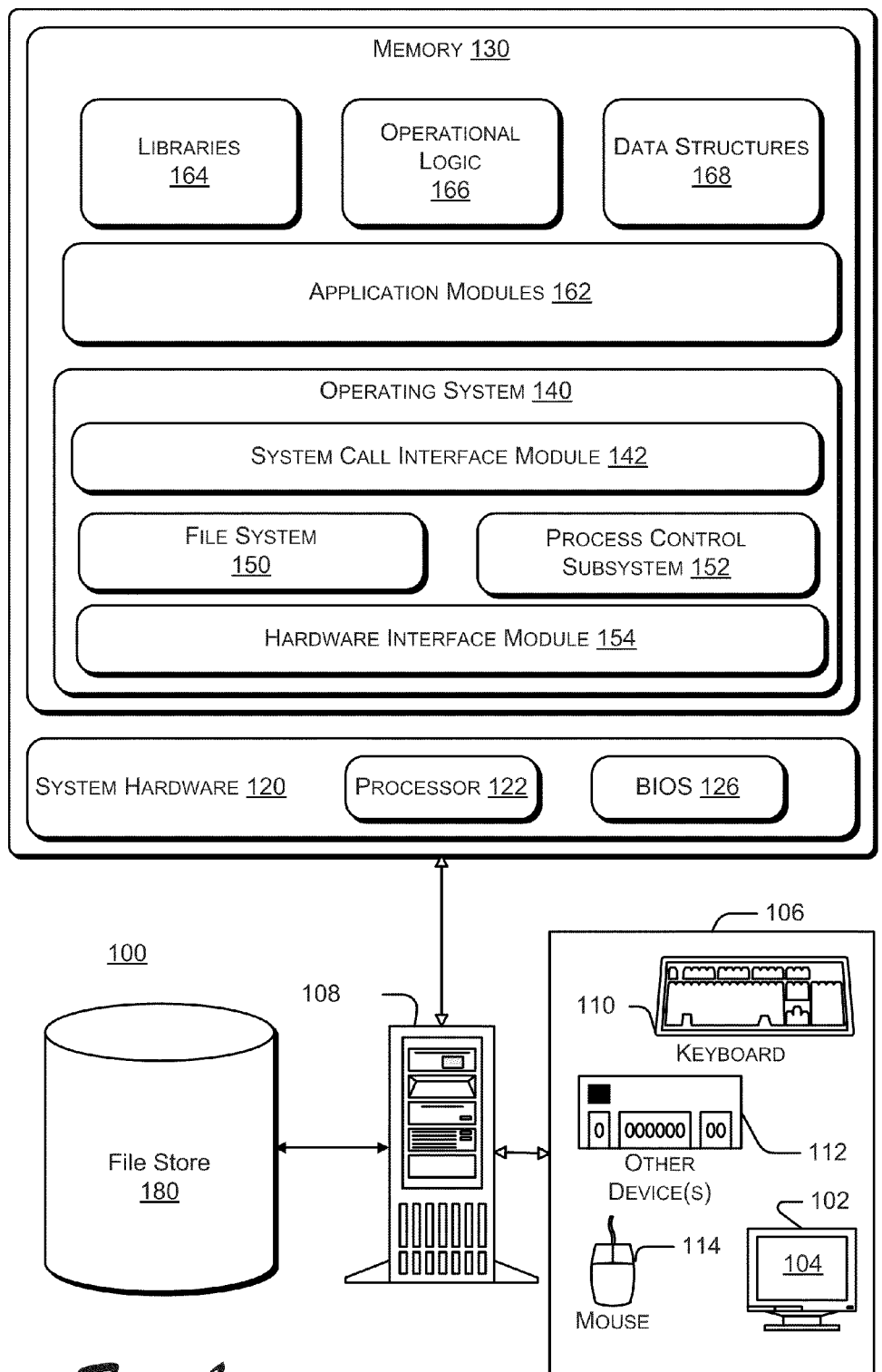
FIG. 1 is a schematic illustration of one embodiment of a computing system adapted to implement SATA/eSATA port configuration, according to embodiments.

FIG. 1 is a schematic illustration of one embodiment of a computing system adapted to implement SATA/eSATA port configuration, according to embodiments. The computer system 100 includes a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that allows the system 100 to receive input from a developer and/or a user. The computer 108 includes system hardware 120 and random access memory and/or read-only memory 130. A file store 180 may be coupled to computer 108. File store 180 may be internal such as, e.g., one or more hard drives, or external such as, e.g., one or more external hard drives, network attached storage, or a separate storage network.

System hardware 120 may include one or more processors 122. Memory 130 includes an operating system 140 for managing operations of computer 108. In one embodiment, operating system 140 includes a hardware interface module 154 that provides an interface to system hardware 120. In addition, operating system 140 includes one or more file systems 150 that managed files used in the operation of computer 108 and a process control subsystem 152 that manages processes executing on computer 108. Operating system 140 further includes a system call interface module 142 that provides an interface between the operating system 140 and one or more application modules 162.

In operation, one or more application modules 162 and/or libraries 164 executing on computer 108 make calls to the system call interface module 142 to execute one or more commands on the computer's processor. The system call interface module 142 invokes the services of the file systems 150 to manage the files required by the command(s) and the process control subsystem 152 to manage the process required by the command(s). The file system(s) 150 and the process control subsystem 152, in turn, invoke the services of the hardware interface module 154 to interface with the system hardware 120.

The particular embodiment of operating system 140 is not critical to the subject matter described herein. Operating system 140 may be embodied as a UNIX operating system or any derivative thereof (e.g., Linux, Solaris, etc.) or as a Windows® brand operating system.

In one embodiment, memory 130 may include one or more application modules 162 that execute on operating system 140. The particular operation(s) of application modules 162 are not important to the subject matter described herein. Memory 130 may further include one or more user interface modules 164 that provide a user interface to the one or more application modules 162.

In one embodiment, memory 130 may further include an operational logic module 166 that includes logic instructions which, when executed, configure the one or more processors to implement operations for SATA/eSATA port configuration. In alternate embodiments, operational logic module 166 may be implemented in, e.g., the basic input/output system (BIOS) 126 of computing device 130, such that operational logic module 166 is invoked when computing device 100 is activated. In alternate embodiments, operational logic 166 may be implemented in hard-wired circuitry in computing device 100. Operational logic module 166 is explained in greater detail below.

Figure 2:
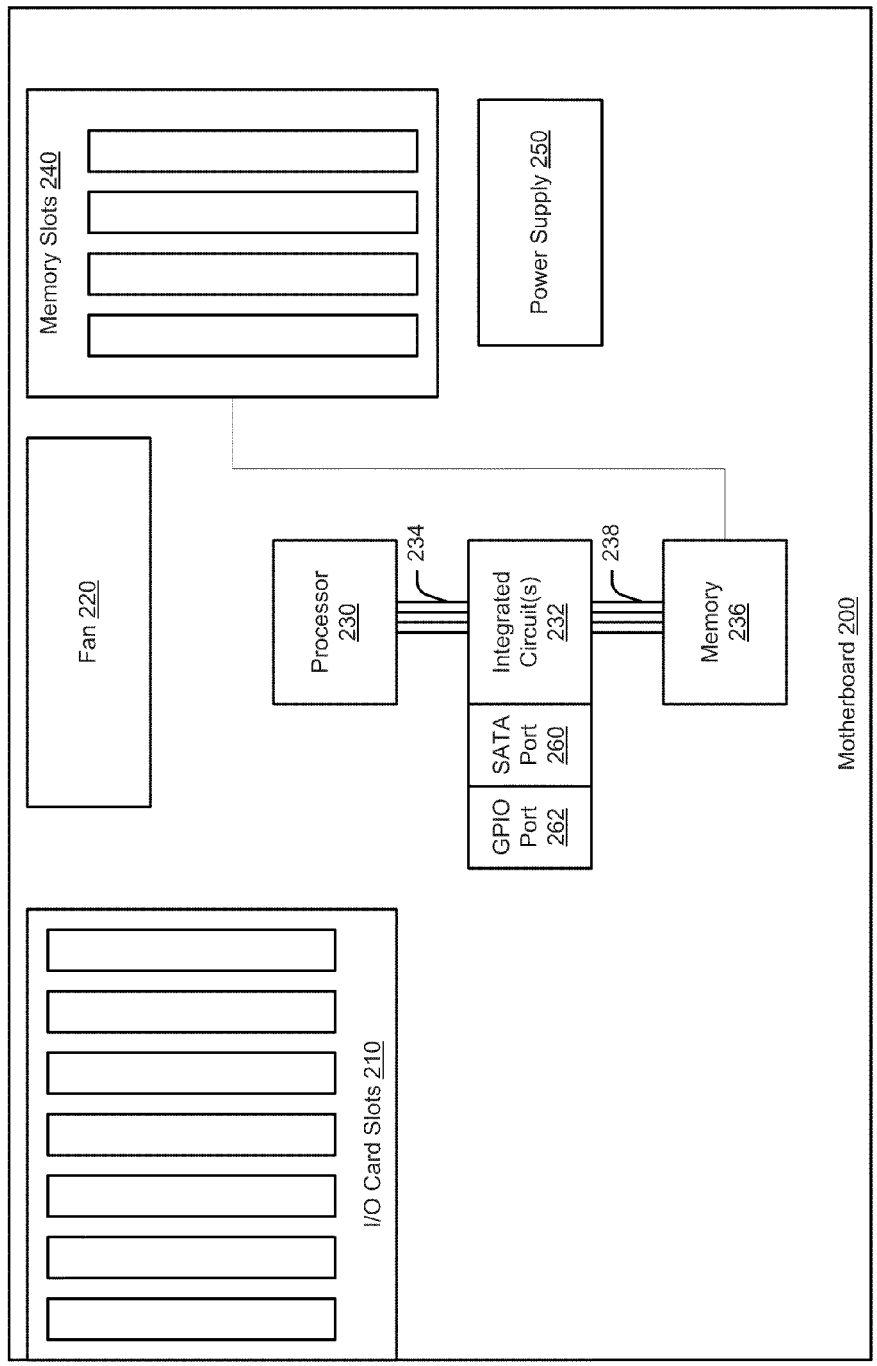
FIG. 2 is a schematic illustration of a first embodiment of a circuit assembly adapted to implement SATA/eSATA port configuration, according to embodiments.

The computing system 100 may include one or more circuit board assemblies. FIG. 2 is a schematic illustration of a first embodiment of a circuit assembly adapted to implement SATA/eSATA port configuration, according to embodiments.

Motherboard 200 may include a processor 230. For example, the processor 230 may be one or more processors in the Pentium® family of processors including the Pentium® II processor family, Pentium® III processors, Pentium® IV processors, Pentium® M processors available from Intel® Corporation of Santa Clara, California. Alternatively, other CPUs may be used, such as Intel's Itanium®, XEON®, and Celeron® processors. The processors may have a single or multi core design.

One or more integrated circuits 232 may be coupled to the processor by a communication bus 234. For example, integrated circuits 232 may include a graphics and memory control hub (GMCH), and include a memory controller that is coupled to a main system memory 236 by a communication bus 238. The main system memory 236 stores data and sequences of instructions that are executed by the processor 230. In one embodiment, the main system memory 236 includes random access memory (RAM); however, the main system memory 236 may be implemented using other memory types such as dynamic RAM (DRAM), synchronous DRAM (SDRAM), and the like. Additional devices may also be coupled to the bus 234, such as multiple CPUs and/or multiple system memories. Motherboard 200 may comprise at least one SATA port 260 proximate the integrated circuit(s) 232. SATA port 260 may receive a SATA cable connector to provide a connection between the integrated circuit(s) 232 and a device, e.g., a hard disk drive. Motherboard 200 further includes a general purpose input/output (GPIO) port 262 proximate the SATA port 260. In some embodiments, GPIO port 262 may be implemented as one or more pins which are coupled to a predetermined voltage level. For example, the pins may be coupled to ground or to an operating voltage associated with the motherboard 200 (i.e., Vcc).

Motherboard 200 may include one or more memory slots 240. In one embodiment memory slots 240 may be configured to accommodate memory modules such as, e.g., dual in-line memory modules (DIMMs). The memory modules coupled to memory slots 240 may be used to implement system memory 236.

Motherboard 200 may include a power supply 250 to supply power to the various components of motherboard and a fan 220 to facilitate dissipating heat generated by various components of motherboard 200.

Motherboard 200 may include an array of input/output (I/O) card slots 210 configured to receive peripheral I/O cards such as, e.g., sound cards, video cards, or the like. Motherboards compatible with an ATX standard commonly include an array of seven I/O slots 210.

Figure 3A:
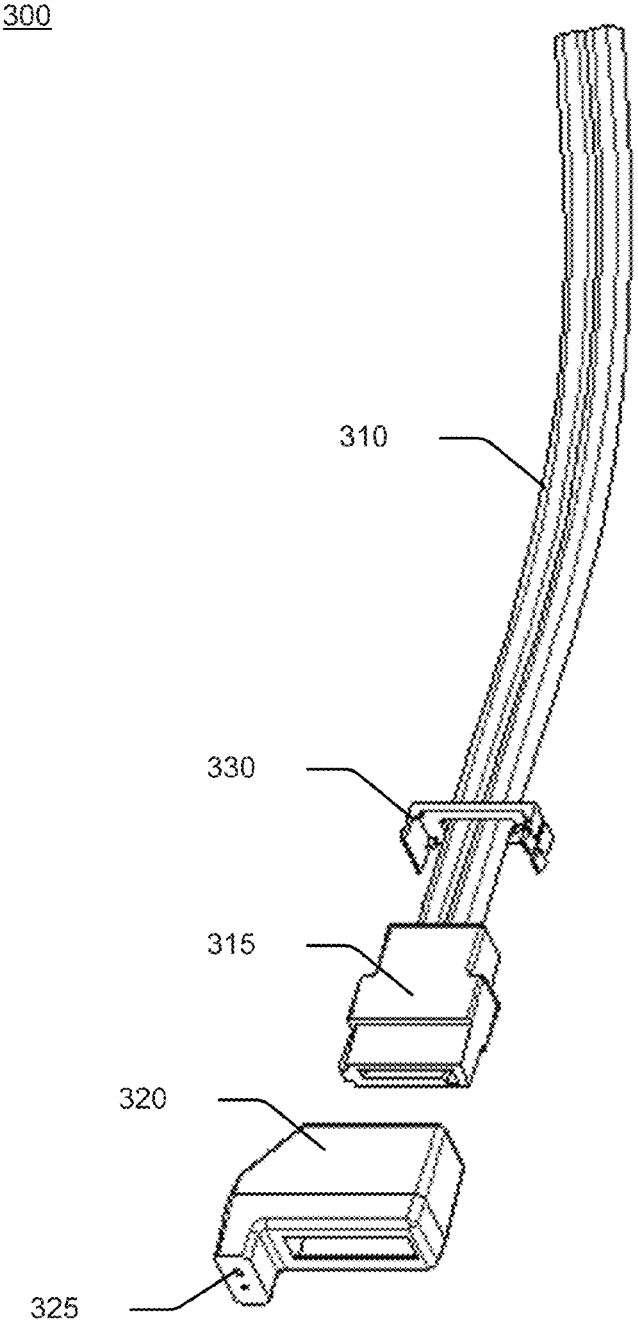

FIGS. 3A-3E are various perspective views of a cable assembly 300 adapted to implement SATA/eSATA port configuration, according to embodiments. Referring first to FIG. 3A, cable assembly 300 comprises a SATA cable 310 having a SATA connector 315. Cable assembly 300 further comprises an adapter 320 to receive the SATA connector 315. Adapter 320 comprises a GPIO connector 325 adapted to couple with the GPIO port 262 on motherboard 200. In some embodiments, GPIO connector 325 may be implemented as receptacles to receive the pins on GPIO port 262. Cable assembly 300 may further include an adapter cap 330 which connects to adapter 320.

In use, SATA connector slides into the adapter 320 and may be secured by cap adapter cap 330. FIGS. 3B and 3C are perspective views of cable assembly 300 with the SATA connector 315 encased in the adapter 320. Referring to FIGS. 3B and 3C, SATA connector 315 extends through adapter 315 and is secured in place by cap 330. GPIO connector 325 is positioned adjacent the SATA connector 315.

Figures 3D, 3E:
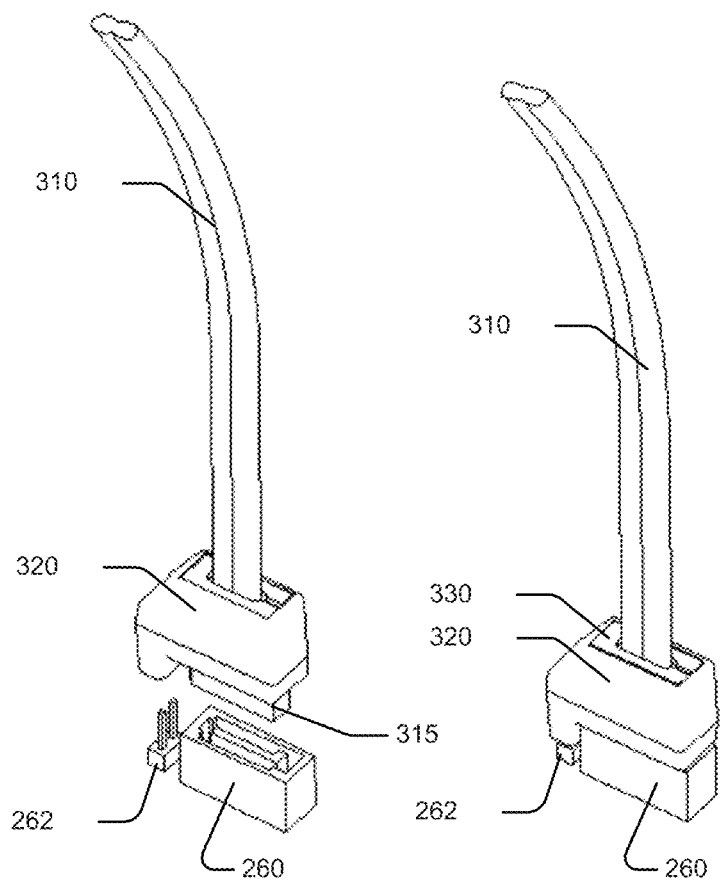

The cable assembly 300 may then be coupled to the motherboard 200 to connect the integrated circuit(s) to a SATA device, e.g., a hard drive, or to an eSATA device, e.g., an external hard drive. FIGS. 3D and 3E are perspective views of cable assembly 300 coupling with the SATA port 260 and the GPIO port 262 on motherboard 200. Referring to FIGS. 3D and 3E, SATA connector 315 is received in SATA port 260 and GPIO connector 325 receives the pins on GPIO port 262.

Figure 4:
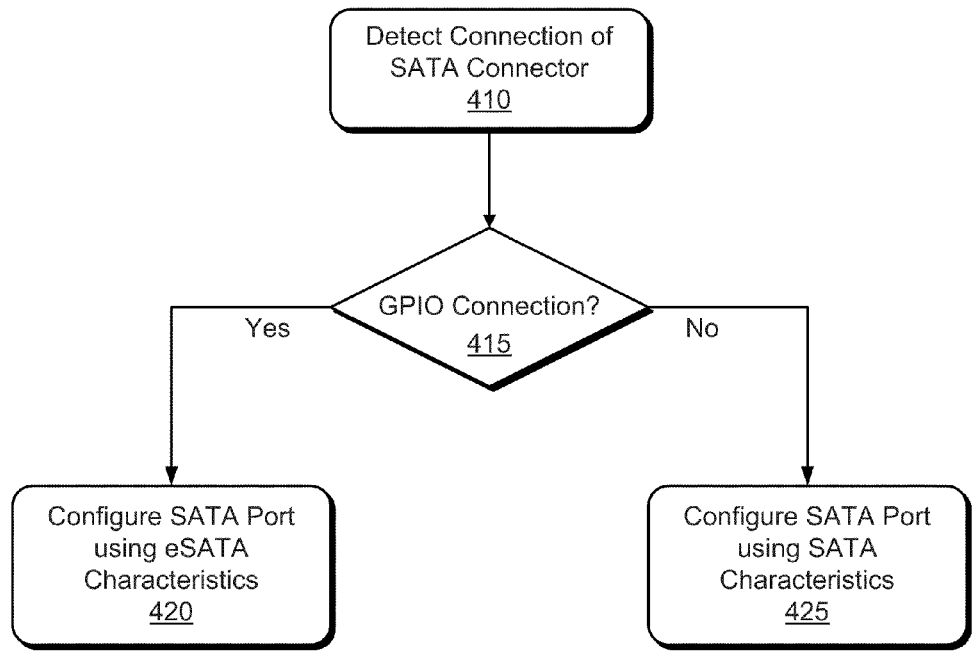
FIG. 4 is a flowchart illustrating operations in one embodiment of a computing system adapted to implement electrical encoding of cable types and configurations.

In some embodiments, operational logic module 166 implements operations to configure selectively the SATA port 260 using either SATA configuration parameters or eSATA configuration parameters based at least in part upon the detection of a signal indicating whether the GPIO connector 325 is coupled to the GPIO port 262 on the motherboard 200. FIG. 4 is a flowchart illustrating operations in one embodiment of a computing system adapted to implement electrical encoding of cable types and configurations. Referring to FIG. 4, at operation 410 the operational logic module 166 detects the connection of a SATA connector 315 to the SATA port 260 on the motherboard 200.

At operation 415 the operational logic module 166 determines whether the GPIO connector 325 is connected to the GPIO port 262 adjacent the SATA port 260. In some embodiments, determining whether the GPIO connector 325 is connected to the GPIO port 262 adjacent the SATA port 260 comprises detecting a signal generated when the pins of GPIO port 262 are coupled to the GPIO connector 325. For example, one of the pins may be connected to an operating voltage (i.e., Vcc) while the other pin may be connected to ground, and the GPIO connector 325 may provide an electrical connection between the pins when the pins of GPIO port 262 are coupled to the GPIO connector 325. Thus, connecting the GPIO connector 325 to the GPIO port 262 causes a small current to flow between the pins of the GPIO port 262. The operational logic module 166 may detect this current (or a change in voltage) as a signal indicating that the GPIO connector 325 is connected to the GPIO port 262.

If, at operation 415, the operational logic module 166 detects the connection of a GPIO connector 325 to the GPIO port 262 adjacent the SATA port 260, then control passes to operation 420 and the operational logic module 166 configures the SATA port using eSATA characteristics. By contrast, if at operation 415, the operational logic module 166 does not detect the connection of a GPIO connector 325 to the GPIO port 262 adjacent the SATA port 260, then control passes to operation 425 and the operational logic module 166 configures the SATA port using SATA characteristics.

Figure 5:
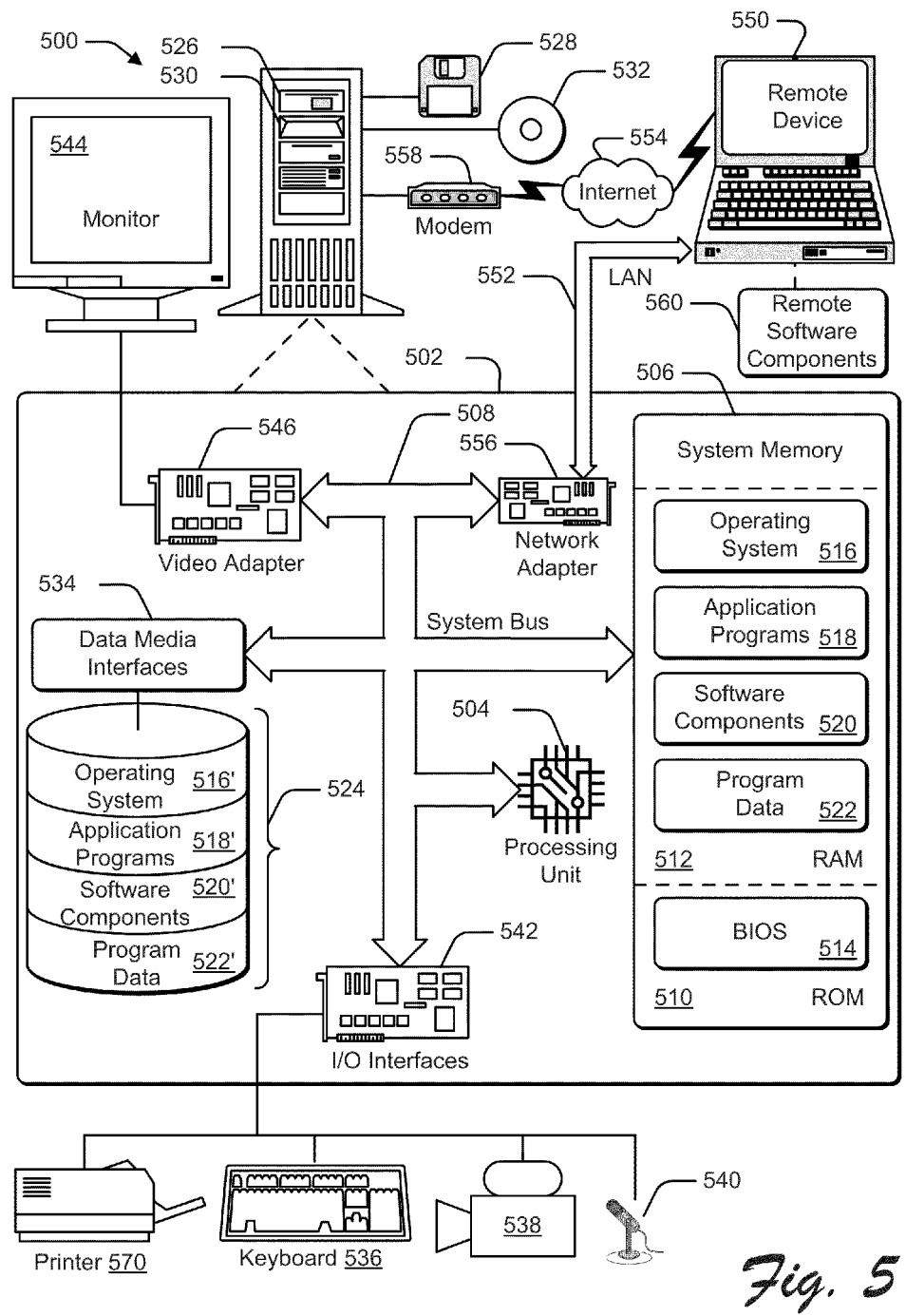
FIG. 5 is a schematic illustration of a computing environment according to an embodiment.

Various components and functionality described herein are implemented with a number of individual computers. FIG. 5 shows components of typical example of such a computer, referred by to reference numeral 500. The components shown in FIG. 5 are only examples, and are not intended to suggest any limitation as to the scope of the functionality of the invention; the invention is not necessarily dependent on the features shown in FIG. 5.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 5, the components of computer 500 may include, but are not limited to, a processing unit 504, a system memory 506, and a system bus 508 that couples various system components including the system memory 506 to the processing unit 504. The system bus 508 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 500 typically includes a variety of computer-readable media. Computer-readable media can be any available media that can be accessed by computer 500 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 506 includes computer storage media in the form of volatile and/or nonvolatile memory such as read only memory (ROM) 510 and random access memory (RAM) 512. A basic input/output system 514 (BIOS), containing the basic routines that help to transfer information between elements within computer 500, such as during start-up, is typically stored in ROM 510. RAM 512 typically contains data and/or program modules that are immediately accessible to and/or presently being operated on by processing unit 504. By way of example, and not limitation, FIG. 5 illustrates operating system 516, application programs 518, other software components 520, and program data 522.

The computer 500 may also include other removable/non-removable, volatile/nonvolatile computer storage media. By way of example only, the computer system of FIG. 5 may include a hard disk drive 524 that reads from or writes to non-removable, nonvolatile magnetic media, a magnetic disk drive 526 that reads from or writes to a removable, nonvolatile magnetic disk 528, and an optical disk drive 530 that reads from or writes to a removable, nonvolatile optical disk 532 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 524 is typically connected to the system bus 508 through a non-removable memory interface such as data media interface 534, and magnetic disk drive 526 and optical disk drive 530 are typically connected to the system bus 508 by a removable memory interface.

The drives and their associated computer storage media discussed above and illustrated in FIG. 5 provide storage of computer-readable instructions, data structures, program modules, and other data for computer 500. In FIG. 5, for example, hard disk drive 524 is illustrated as storing operating system 516', application programs 518', software components 520', and program data 522'. Note that these components can either be the same as or different from operating system 516, application programs 518, software components 520, and program data 522. Operating system 516, application programs 518, other program modules 520, and program data 522 are given different numbers here to illustrate that, at a minimum, they are different copies. A user may enter commands and information into the computer 500 through input devices such as a keyboard 536 and pointing device 538, commonly referred to as a mouse, trackball, or touch pad. Other input devices (not shown) may include a microphone 540, joystick, game pad, satellite dish, scanner, or the like. These and other input devices are often connected to the processing unit 504 through an input/output (I/O) interface 542 that is coupled to the system bus, but may be connected by other interface and bus structures, such as a parallel port, game port, or a universal serial bus (USB). A monitor 544 or other type of display device is also connected to the system bus 506 via an interface, such as a video adapter 546. In addition to the monitor 544, computers may also include other peripheral output devices (e.g., speakers) and one or more printers 570, which may be connected through the I/O interface 542.

The computer may operate in a networked environment using logical connections to one or more remote computers, such as a remote computing device 550. The remote computing device 550 may be a personal computer, a server, a router, a network PC, a peer device or other common network node, and typically includes many or all of the elements described above relative to computer 500. The logical connections depicted in FIG. 5 include a local area network (LAN) 552 and a wide area network (WAN) 554. Although the WAN 554 shown in FIG. 5 is the Internet, the WAN 554 may also include other networks. Such networking environments are commonplace in offices, enterprise-wide computer networks, intranets, and the like.

When used in a LAN networking environment, the computer 500 is connected to the LAN 552 through a network interface or adapter 556. When used in a WAN networking environment, the computer 500 typically includes a modem 558 or other means for establishing communications over the Internet 554. The modem 558, which may be internal or external, may be connected to the system bus 508 via the I/O interface 542, or other appropriate mechanism. In a networked environment, program modules depicted relative to the computer 500, or portions thereof, may be stored in the remote computing device 550. By way of example, and not limitation, FIG. 5 illustrates remote application programs 560 as residing on remote computing device 550. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A computer, comprising:
   a circuit board assembly having at least one Serial Advanced Technology Attachment (SATA) port and a general purpose input/output port proximate the SATA port;
   signal generating circuitry to:
      generate a signal in response to the general purpose input/output port being coupled to a first type of connector that is removably connectable to a mating connector of the circuit board assembly,
      wherein the signal is not generated in response to the mating connector being coupled to a second, different type of connector that is removably connectable to the mating connector; and
   an operational logic module to configure the SATA port using first configuration characteristics in response to the signal generating circuitry generating the signal indicating that the general purpose input/output port is coupled to the first type of connector, and to configure the SATA port using second configuration characteristics in response to the signal generating circuitry not generating the signal, the first configuration characteristics being different than the second configuration characteristics.

2. The computer of claim 1, wherein the general purpose input/output port comprises at least one pin coupled to a predetermined voltage value.

3. The computer of claim 2, wherein the pin is coupled to ground.

4. The computer of claim 2, further comprising at least one cable assembly comprising the first type of connector.

5. The computer of claim 4, wherein the first type of connector comprises the second type of connector and an adapter to receive the at least one pin coupled to the predetermined voltage value.

6. The computer of claim 4, wherein the operational logic module resides in a basic input/output system (BIOS) of the computer.

7. The computer of claim 1, wherein the operational logic module is to:
   detect the signal generated by the signal generating circuitry;
   configure the SATA port using External SATA (eSATA) configuration characteristics in response to detecting the signal; and
   configure the SATA port using SATA configuration characteristics in response to not detecting the signal.

8. The system of claim 1, wherein the first configuration characteristics are eSATA configuration characteristics and the second configuration characteristics are SATA configuration characteristics.

9. The computer of claim 1, wherein the first and second configuration characteristics comprise first and second electrical configuration characteristics.

10. A computer, comprising:
    one or more processors;
    a circuit board assembly having at least one Serial Advanced Technology Attachment (SATA) port and a general purpose input/output port proximate the SATA port;
    signal generating circuitry to generate a signal in response to the general purpose input/output port being coupled to a first type of connector that is removably connectable to a mating connector of the circuit board assembly,
    wherein the signal is not generated in response to the mating connector being coupled to a second, different type of connector that is removably connectable to the mating connector; and
    a memory module communicatively connected to the one or more processors and comprising instructions stored in a computer readable medium which, when executed on the one or more processors, cause the one or more processors to configure the SATA port using External SATA (eSATA) configuration characteristics in response to the signal generating circuitry generating the signal indicating that the general purpose input/output port is coupled to the first type of connector, and to configure the SATA port using SATA configuration characteristics in response to the signal generating circuitry not generating the signal, the first configuration characteristics being different than the second configuration characteristics.

11. The computer of claim 10, wherein the general purpose input/output port comprises at least one pin coupled to a predetermined voltage value.

12. The computer of claim 11, wherein the pin is coupled to ground.

13. The computer of claim 11, further comprising at least one cable assembly comprising the first type of connector.

14. The computer of claim 13, wherein the first type of connector includes an adapter to receive the at least one pin coupled to the predetermined voltage value.

15. The computer of claim 10, wherein the instructions are part of a basic input/output system (BIOS) of the computing system.

16. The computer of claim 10, wherein the first and second configuration characteristics comprise first and second electrical configuration characteristics.

17. A method, comprising:
    detecting, by a computer, a connection of a first type of connector coupled to a first external device to a general purpose input/output port proximate a Serial Advanced Technology Attachment (SATA) port, the general purpose input/output port and the SATA port provided on a circuit board assembly of the computer, wherein the first type of connector is removably connectable to a mating connector of the circuit board assembly;
    generating, by signal generating circuitry in the computer, a signal in response to detecting the connection of the first type of connector to the general purpose input/output port, wherein the signal generating circuitry does not generate the signal in response to connection of the mating connector to a second, different type of connector that is coupled to a second external device, wherein the second type of connector is removably connectable to the mating connector;
    configuring the SATA port using first electrical configuration characteristics in response to the signal generated by the signal generating circuitry indicating that the general purpose input/output port is connected to the first type of connector; and
    configuring the SATA port using second electrical configuration characteristics different from the first configuration characteristics in response to not detecting the signal from the signal generating circuitry.

18. The method of claim 17, wherein the general purpose input/output port is coupled to a known voltage value, and wherein detecting the connection of the first type of connector to the general purpose input/output port comprises detecting a deviation from the predetermined voltage value.

19. The method of claim 17, wherein the first configuration characteristics are eSATA configuration characteristics and the second configuration characteristics are SATA configuration characteristics.

* * * * *

UNITED STATES PATENT AND TRADEMARK OFFICE
CERTIFICATE OF CORRECTION

PATENT NO.        : 8,984,176 B2  
APPLICATION NO.   : 13/125972  
DATED             : March 17, 2015  
INVENTOR(S)       : Christopher Rijken et al.

It is certified that error appears in the above-identified patent and that said Letters Patent is hereby corrected as shown below:

In the Claims

In column 8, line 29, in Claim 8, delete "system" and insert -- computer --, therefor.

Signed and Sealed this  
Twenty-first Day of July, 2015

Michelle K. Lee  
*Director of the United States Patent and Trademark Office*